(No Model.)
F. L. O. WADSWORTH.
REVERSING MECHANISM.
No. 547,701. Patented Oct. 8, 1895.
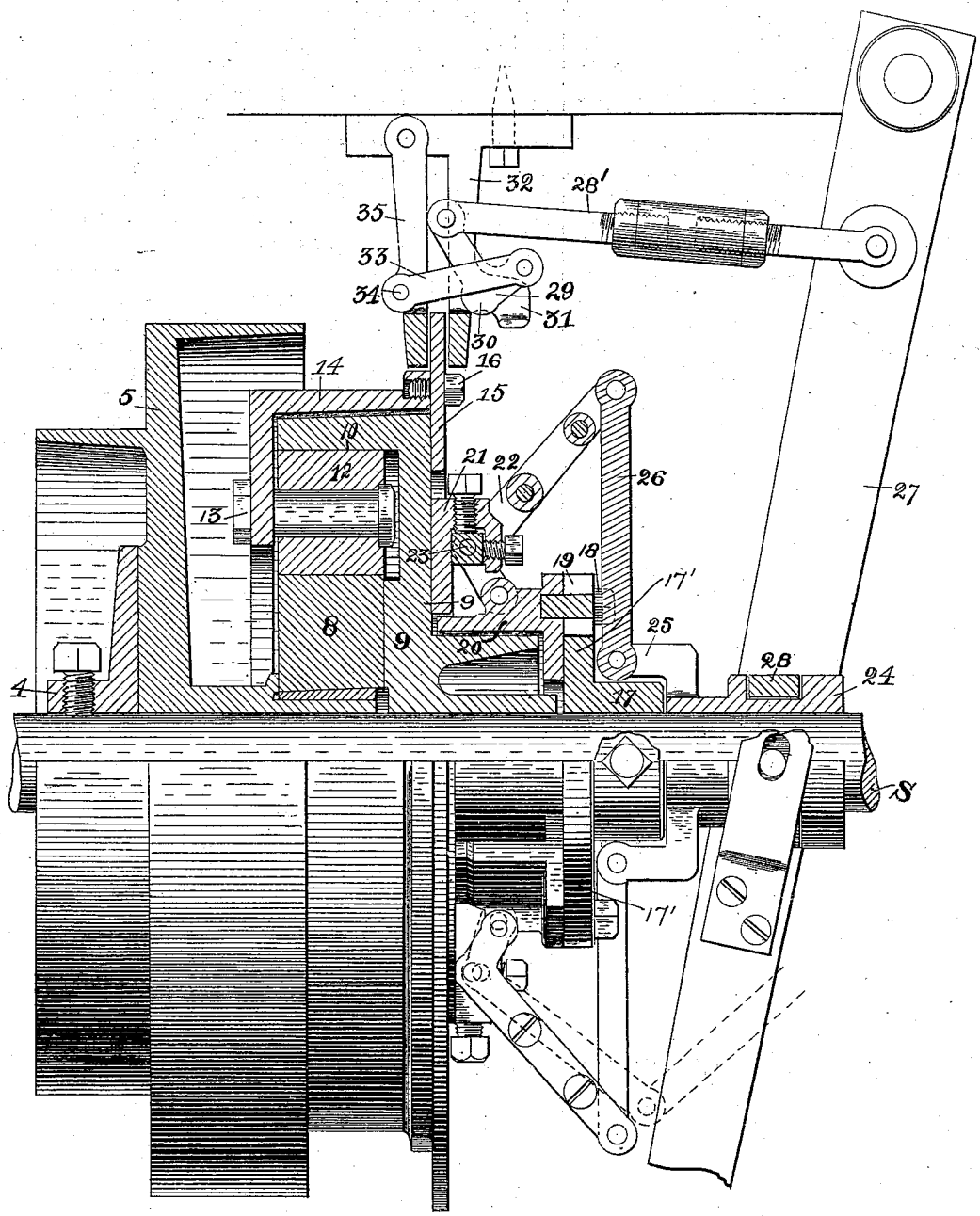
WITNESSES
INVENTOR
Frank L. O. Wadsworth.
By Chandlee Macauley
Attorneys.

UNITED STATES PATENT OFFICE.

FRANK L. O. WADSWORTH, OF WASHINGTON, DISTRICT OF COLUMBIA.

REVERSING MECHANISM.

SPECIFICATION forming part of Letters Patent No. 547,701, dated October 8, 1895.

Application filed January 27, 1894. Serial No. 408,233. (No model.)

*To all whom it may concern:*

Be it known that I, FRANK L. O. WADSWORTH, a citizen of the United States, residing at Washington, in the District of Columbia, have invented certain new and useful Improvements in Reversing Mechanism; and I do hereby declare the following to be a full, clear, and exact description of the invention, such as will enable others skilled in the art to which it appertains to make and use the same.

My invention relates to double-motion clutch mechanisms for driving-pulleys, and has for its object to provide a simple device of this nature which may be placed directly on a power-shaft, and which may be operated to drive a pulley on this shaft in either direction at the same or at different speeds, or to release it entirely at will, and thus make it possible to dispense with the ordinary countershaft with its two sets of tight and loose pulleys and direct and reverse belts. Devices of this nature are not entirely new, but in most of those which have heretofore been used for the foregoing purpose some part of the reversing mechanism has been permanently connected with the shaft and is kept in motion by it even when the clutch mechanism is not in use, producing more or less friction and consequent wear, as well as considerable noise in case toothed gears are used for the reversal of the motion. In my improved device the only parts connected with the driving-shaft are two smooth clutch-disks, which are only brought into contact with a corresponding clutch-face on the reversing mechanism when the latter is actually driving the machinery to which it may be attached by belts, gearing, or otherwise, and which at other times are entirely out of contact with any part of said mechanism, all parts of which remain consequently at such times at rest.

Referring now to the drawing, forming a part of this specification, and in which like letters and numerals indicate similar parts, the figure is a side view, partly in section, of a device of this character, which I have termed a "double-motion" clutch, as constructed in accordance with my invention.

In the drawing, S represents a driving-shaft, having a clutch disk 4 secured thereto by means of a screw, as shown in the drawing, or by a key in the usual manner. Arranged loosely on the shaft S and adjacent to the said disk is a drive-pulley 5, which may be a cone-pulley having any number of steps, a plain band-pulley, a gear-wheel, or any other desired form, and having a flat bearing-surface to be caused to impinge the adjacent face of the clutch-disk. To the hub of the pulley 5 is attached, by means of a spline or other contrivance, a gear-wheel 8. Adjacent to this and also loose on the shaft S is a wheel 9, having an internal gear-face 10 opposite the face of 8.

Interposed between the internal face 10 of the wheel 9 and the external face of the wheel 8 and forming means for the communication of motion from the former to the latter, is a series of gear-rolls 12, mounted on suitable studs 13, secured to the inwardly-projecting portion of an annular ring 14, loosely mounted on the circumference of the wheel 9 and prevented from longitudinal movement thereon by a flange 15, secured to it by screws 16 or otherwise. This flange projects beyond the periphery of the ring 14 and can be clamped fixedly in position under certain conditions, as will be hereinafter explained.

Attached rigidly to the shaft S in any desired manner is a disk 17' on a hub 17, provided with radial slots in which slide headed pins 18, attached to the brake-shoes 20. These shoes are moved simultaneously with the annular clamp-disk 21 by bell-crank levers 22, the central pivots of which have adjustable bearings 23 attached to the clamp-disk, the short ends of said levers being pivotally attached to the shoes 20. Motion is imparted to the levers 22 through the medium of the sliding collar 24, provided with projecting-ears 25 and the toggle-levers 26, the inner ends of which are pivoted in the ears 25 and the outer ends to the long ends of the bell-crank levers 22. Longitudinal movement is given the collar 24 by means of a lever 27, connected therewith by means of an encircling band 28, having laterally projecting pins to enter suitable slots in a fork of the lever 27, as shown, or in any other suitable manner. This lever is pivoted at one end to the shaft-beams or to any other convenient support.

Pivoted to the lever 27 at a suitable point is a coupling-rod 28', adjustable as to its length through the medium of a turnbuckle, as shown, and pivoted at its opposite end to the bell-crank lever 29, having its fulcrum 30 on a suitable projection 31 of the stationary element 32 of a clamping mechanism secured to one of the shaft-beams or floor-beams and projecting to lie in proximity to the disk 15. Secured to the other arm of the lever 29 is a toggle-lever 33, having pivotal connection at its opposite end at 34 with the pivoted member 25 of the gripping device, said pivoted member projecting to lie parallel with the member 32 through their lengths and on the opposite side of the disk 15, so that by the motion of lever 27 the latter disk may be clamped to the stationary member and thereby prevented from rotation.

The operation of my invention is as follows: The shaft S being in revolution and the lever 27 in the position shown, the shoe 20 is raised to its limit and pressed against the disk 17', and the lever 22, acting on its pivotal connection with 20 as a fulcrum, presses the disk 21 against the face of wheel 9, which in turn is pressed against wheel 8 on the pulley 5, said pulley being finally pressed against the clutch-disk 4. Thus it will be seen that the pulley, together with the wheel 9, will be clamped between the clutch-disk 4 and the clamp-disk 21, both of which will revolve with the driving-shaft, and the pulley and wheel 9, together with the annular ring 14, which is now free, will revolve in the direction of and with the speed of the shaft S. In this position the clamping mechanism and the lever 27 are locked in position by virtue of the vertical dead-center position of the clamping-levers 26. When the lever 27 is moved to the right, the shoes 20 are depressed and the disk 21 is at the same time drawn away from the face of the wheel 9. The relative relations of the various parts of the clamping mechanism are such that when the shifting lever is vertical none of the parts of the mechanism are clamped to the shaft, and the pulley 5, together with the wheel 9, annular ring 14, and intermediate gears 12 therefor remain at rest. As the lever 27 is moved still farther to the right, the brake-shoes 20 are further depressed, and, finally, when the bell-crank lever has reached the position shown in dotted lines, in which the pivot 23 is vertically above the pivot on the brake-shoe, the brake-shoes are clamped against the hub of wheel 9, causing the wheel 9 to revolve in unison with the disk 17', the length of the coupling-rod 28' being so adjusted that at the same time the jaws 32 and 35 clasp the flange 15 and hold the ring 14 stationary. The wheel 9 now acts upon the gear-wheels or friction-rolls 12, causing them to impart their motion in an opposite direction to the friction-wheel 8, secured to the hub of pulley 5, and the latter will therefore be caused to revolve in a direction opposite to its former movement at a speed determined by the relative pitch diameters of the wheels 8 and 9.

The principle of the action and the function of the various parts of the mechanism will now be clearly understood. It will be seen that the only pieces permanently attached to the shaft and revolving with it are the clutch-disk 4, the hub 17, and its disk 17' with its attached brake-shoes, clamp disk or plate and accessory levers, the internal gear 9 being clamped to the shaft only when the pulley is in motion. The only motion of the idle gears 12 relatively to the wheels 8 and 9 occurs, therefore, during the period of reverse motion. It is understood, of course, that for the idle or power transmitting wheels, we may use either toothed gears or friction-gears with either parallel or coned surfaces. Thus in order to increase the grip on the driving-surfaces, and, further, in order to allow it to be adjusted to any required degree of pressure, these idle gears may be formed of two cones, as in the drawing, the two parts being drawn together by means of a nut 45, and then clamped one on the other by means of a screw or screws 46. The internal and external gear-wheels have correspondingly-coned surfaces, as shown in the drawing.

It will be readily appreciated that the details of my invention may be varied without departing from the spirit of my invention.

Having now described my invention, what I claim is—

1. A device of the class described comprising a drive shaft, a power transmitting wheel arranged loosely thereon, idle gears in constant engagement with said power transmitting wheel, a disk arranged also loosely on the shaft and having an internal gear in constant engagement with the idle gears, mechanism for clamping said disk to revolve with the shaft and for rendering the said gears operative with respect to the disk and the power transmitting wheel in order to transmit motion from the former to the latter, for throwing the said gears out of their operative relation and clamping the said wheel against the clutch disk to revolve therewith.

2. A device of the class described comprising a drive shaft, a power transmitting wheel loose thereon, an internal gear also loose on the shaft, idle gears in constant engagement with the wheel and internal gear supports for said idle gears, a clamp for holding said supports stationary at times and means for simultaneously clamping the internal gear to revolve with the shaft whereby said gears may transmit motion from the disk to the power transmitting wheel in a negative direction; clutch disks arranged to clamp the power transmitting wheel into direct operative relation with the revolving shaft, and a lever having connections with the said clamp and clutch disks to operate them alternately.

3. A device of the class described comprising a wheel loose on a shaft and having a gear surface, an internal gear wheel encircling that of the said wheel and also loose on the shaft, idler gears in constant engagement with aforesaid gears, supports for said idler gears, a clamp for holding said supports immovable at times, brake shoes, and means for simultaneously clamping the said internal gear to revolve with the shaft whereby said gears may transmit motion from the internal gear to the power transmitting wheel, in a direction opposite to that of the shaft and at a higher speed, clutch disks adapted to clamp the power transmitting wheel to revolve directly with the shaft, and a lever having connections with both the said brake shoes and clutch disks, and arranged to operate them alternately, substantially as described.

4. A device of the class described comprising a shaft, a gear wheel loose thereon, a second gear wheel also loose on the shaft, idle gears in constant engagement with these two gears, supports for said idle gears, a clamp for holding said supports immovable at times, means for simultaneously clamping the second gear to revolve with the shaft whereby said idle gears may transmit motion from the second gear to the first in a negative direction, a clamp disk fixed on the shaft and a second clamp disk for establishing engagement between the fixed disk and the first gear wheel, whereby the said wheel may be caused to revolve with the shaft, and a lever having connections with both the clamp disk and brake shoes to operate them alternately, or to free both from their engagement and render them inoperative.

5. A device of the class described, comprising a drive-shaft, a wheel loose thereon, a second wheel also loose on the shaft, and connected to the first wheel through a train of idle gears, supports for the idler gears, clamps adapted to cause either wheel to revolve with the shaft, another clamp adapted to grip the support of the idle gears, a system of levers connected with these clamps and so arranged that the wheels may be clamped to revolve with the shaft, or the second wheel only may be clamped to the shaft, and simultaneously the support of the idle gears clamped to a fixed support, the first wheel being now free; or finally all clamps may be thrown out of operative relation with respect to the parts upon which they act, substantially as described.

6. A device of the class described comprising a drive shaft, a wheel normally loose thereon, a second wheel also loose on the shaft, idle gears provided with suitable supports, means for holding said supports stationary, a clamping mechanism comprising a longitudinally movable clamp disk and a series of radially movable shoes, and means for alternately operating said disk to cause it to clamp the wheels to the shaft, and said brake shoes to clamp the second wheel only to the shaft, or to free both clamp disk and brake shoes from their respective wheels.

7. A device of the class described comprising a shaft, a wheel normally loose thereon, a second wheel on the shaft, idle gears provided with suitable supports, a clamping mechanism operating to alternately grip and release said supports, mechanism for clamping the second wheel to the shaft when the idler supports are held stationary, a clamp disk fixed on the shaft and means for clamping the first wheel against said disk when the idler supports are released.

8. A device of the class described comprising a shaft, a wheel loose thereon, a second wheel also loose on the shaft, idle gears in constant engagement with both wheels and having suitable supports, a gripping mechanism operating to alternately grip and release the said idler supports, mechanism for clamping the second wheel to the shaft when the idler supports are held stationary, a clamp disk fixed on the shaft and means for clamping the first wheel against said disk, when the idler supports are released.

9. A device of the class described comprising a shaft, a wheel normally loose thereon, a second wheel also normally loose on the shaft, idle gears in engagement with both said wheels, a support for these gears, means for holding said support stationary, and means for simultaneously clamping one of the wheels to the shaft to cause it to transmit motion through the idle gears to the other wheel.

10. A device of the class described comprising a shaft, two wheels normally loose thereon, a train of reversing gears connecting said wheels, supports for said train of reversing gears, a system of clamps adapted to clamp one or both wheels to the shaft, or to clamp the said support for the reversing train to a stationary support, a system of levers connecting said clamps in such a way that both wheels may be clamped to revolve with the shaft; or second, the other wheel may be clamped to the shaft and the support for the reversing train simultaneously clamped in position, the first wheel being now free; or third, all clutches may be thrown out of operation simultaneously.

In testimony whereof I affix my signature in presence of two witnesses.

FRANK L. O. WADSWORTH.

Witnesses:
ALVAN MACAULEY,
GEO. H. CHANDLEE.